United States Patent [19]
La Garde

[11] 3,959,023
[45] May 25, 1976

[54] FLUSHING PUMP FOR SEA WATER BATTERIES

[75] Inventor: Ivan La Garde, Chelmsford, Mass.

[73] Assignee: Sanders Associates, Inc., Nashua, N.H.

[22] Filed: June 23, 1975

[21] Appl. No.: 589,500

[52] U.S. Cl. .............................. 136/160; 136/100 M
[51] Int. Cl.² .......................................... H01M 2/38
[58] Field of Search ........................ 136/100 M, 160

[56] References Cited
UNITED STATES PATENTS

| | | | |
|---|---|---|---|
| 3,012,087 | 12/1961 | Van Billiard et al. | 136/100 M |
| 3,463,671 | 8/1969 | Doll et al. | 136/160 |
| 3,470,032 | 9/1969 | Egan | 136/160 |

Primary Examiner—Donald L. Walton
Attorney, Agent, or Firm—Louis Etlinger; William L. Hunter

[57] ABSTRACT

A power supply system including a sea water battery for supplying a light load and/or a heavy load. A pump is actuated concurrently with the energization of the heavy load and is hydraulically connected to pump sea water electrolyte through the battery.

14 Claims, 6 Drawing Figures

FLUSHING PUMP FOR SEA WATER BATTERIES

FIELD OF THE INVENTION

This invention relates to a system for pumping an electrolyte through a sea water battery.

BACKGROUND OF THE INVENTION

Sea water batteries are, in general, batteries which become operative when immersed in the sea so as to use the sea itself as the electrolyte. Various combinations of electrodes have been used but the magnesium-silver chloride couple has been found especially suitable for use to provide power for such things as torpedoes and sonobuoys. Such batteries have a number of advantages such as (1) a long shelf life, (2) no need to store an electrolyte, (3) a large power-to-weight ratio and (4) a large power-to-volume ratio.

As mentioned above, such a battery is activated by immersing it in the sea. In normal operation a certain amount of sediment or slurry is generated and, if allowed to accumulate, adversely affects operation. Such batteries also evolve bubbles of gas which, during their escape, circulate the electrolyte to some extent and also entrain and remove some of the slurry. It has been found that the operation of these batteries can be greatly improved by providing a mechanism for positively circulating the electrolyte through the battery which, among other things, has the effect of removing the slurry. Various arrangements for providing such circulation are known. In the case of torpedoes, the power may be obtained by means of a sea water scoop. Other applications, such as sonobuoys, may use a pump drawing its energy from the battery itself. Much of the prior art is concerned with the problem of maintaining the output voltage of the battery reasonably constant while the battery is connected continuously to a substantially constant load. Many arrangements for this purpose add the feature of mixing fresh electrolyte with previously circulated electrolyte in controlled proportions.

The above mentioned arrangements, while no doubt satisfactory for their respective intended purposes, are not suitable for situations in which the battery is required to supply a widely varying load. The present invention is directed to the problem of obtaining the most effective operation of a sea water battery which is called upon to operate at great depths and to supply energy to heavy and light loads alternately. For example, an active sonobuoy requires a relatively large expenditure of power during periods of transmission of sonic energy while requiring only a relatively small amount of power while receiving signals and relaying the received signals to an air or surface craft. The difficulty is compounded if the sonobuoy is required to operate at great depths. As the depth increases so does the pressure and an increase in pressure increases the solubility of the by-product gasses. It has been found that at depths of several hundred feet or more the generation of bubbles is so small as to be of little assistance in removing slurry.

It is a general object of the present invention to provide an improved system for pumping an electrolyte through a sea water battery.

A more specific object is to provide a system particularly suitable for use with a battery which is required to supply widely varying loads.

SUMMARY OF THE INVENTION

It has been found, when a sea water battery is operated to supply light and heavy loads alternately, that if a pump of sufficient capacity to remove slurry effectively during periods of heavy load is energized from the battery continuously, the price paid in power consumption over the life of the battery may nullify the advantages of pumping. On the other hand, if a pump of lower capacity having an acceptably small power consumption is used, it has been found that it is incapable of removing slurry during the supply of the heavy load at a rate sufficient to improve overall performance appreciably.

In accordance with the present invention, a pump of adequate capacity is provided together with control equipment for energizing the pump concurrently with the supplying of the heavy load.

More particularly, one embodiment of the present invention comprises a sea water battery including a housing formed to define an electrolyte inlet and an electrolyte outlet and a pump hydraulically connected for pumping sea water into the inlet connection wherein the system includes a light electrical load and a heavy electrical load together with means for selectively energizing the two loads from the battery, and means for actuating the pump concurrently with the energization of the heavy load, whereby, upon such actuation, sea water enters the battery through the inlet and is expelled through the outlet.

DESCRIPTION OF PREFERRED EMBODIMENTS

For a clearer understanding of the invention reference may be made to the following detailed description and the accompanying drawings in which.

Figure 1:
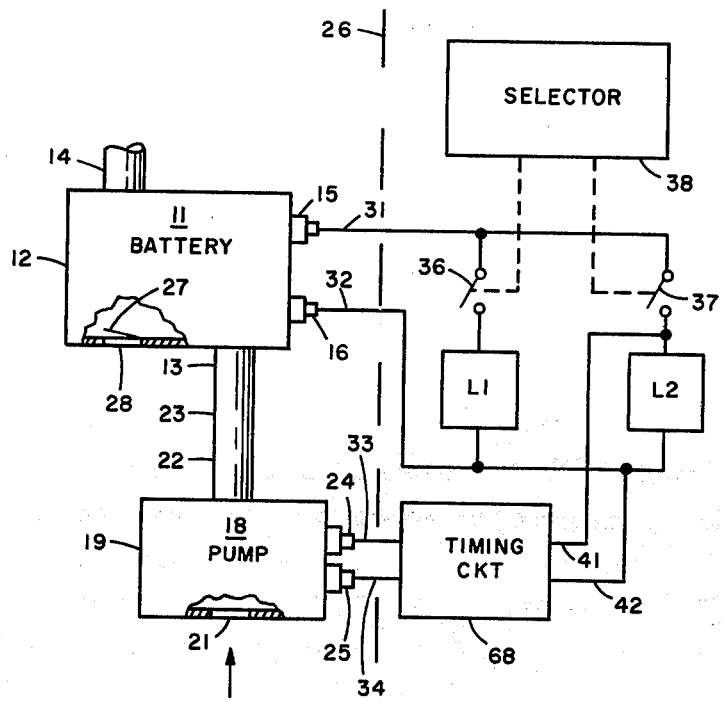
FIG. 1 is a schematic block diagram of apparatus incorporating the invention.

Referring first to FIG. 1 there is shown a sea water battery indicated generally by the reference character 11. The structural details of this battery are not a part of the invention but it is assumed for illustrative purposes that it is a conventional magnesium-silver chloride battery. The battery includes a housing 12 formed to define an electrolyte inlet 13 and an electrolyte outlet 14 and includes electric terminals 15 and 16. Also shown is a pump indicated generally by the reference character 18 which includes a housing 19 formed to define an inlet 21 and an outlet 22. The pump 18 and the battery 11 may be physically mounted together so that the pump outlet 22 and the battery inlet 13 practically coincide or, as illustrated schematically in FIG. 1, they may be connected by means of a conduit 23. The pump 18 also includes electric terminals 24 and 25 by which it may be energized. During operation, everything to the left of the dashed line 26 of FIG. 1 including the battery 11 and the pump 18, is immersed in sea water so that the pump 18, when actuated, draws sea water through its inlet 21 and forces it into the battery inlet 13, filling the battery with sea water, with the excess escaping through the battery outlet 14. The battery 11 also includes a check valve, illustrated as comprising a flapper 27, which cooperates with an auxiliary inlet 28 formed in the housing 12. This construction allows electrolyte to flow, although at a reduced rate, into the auxiliary inlet 28 and out the outlet 14 even when the pump 18 is not actuated. Such flow is caused by convection and by the action of the previously mentioned bubbles of gas which are evolved during operation. The battery 11 is connected to the remainder of the equipment, which may, for example, be the electronics package of a sonobuoy and which is illustrated as lying to the right of the dashed line 26, by means of conductors 31 and 32. Similarly, the pump 18 is connected to the remainder of the equipment by means of electric conductors 33 and 34.

The battery and pump so far described can be used with many different kinds of equipment, for example, with an active sonobuoy. Such a sonobuoy generates and transmits acoustic signals through the water and then receives data in the form of echoes, stores such data and may transmit it to an external receiver. The acoustic receiving circuits, the equipment for storing the data and for transmitting it to an external receiver and also any equipment which may receive a command from an external source, altogether draw comparatively little power from the battery 11 and are indicated schematically in FIG. 1 by the light load L1 which is connected directly to the conductor 32 and is connected through a switch 36 to the conductor 31. The generation and transmission of acoustic energy requires that a comparatively large amount of power be drawn from the battery 11 and the circuits for this purpose are indicated generally by the heavy load L2 which is connected to the conductor 32 and through a switch 37 to the conductor 31. The switches 36 and 37 have been illustrated for clarity as mechanical switches. It will be understood that they may be operated electromagnetically or that the switches may be solid state switches. The operation of the switches is controlled by a selector 38 which may include a programmer such as a clock and which preferably includes apparatus for receiving commands from an external source through a radio link or through an acoustic receiving mechanism, all as is well known in the sonobuoy art. In general, the selector 38 may so control the switches 36 and 37 so that either or both may be open and/or so that either or both may be closed.

As previously noted, during operation of the battery sediment is generated and the removal of this sediment greatly improves the operation of the battery. The greater the load drawn from the battery, the faster the sediment is generated. Accordingly, it is especially important to pump the electrolyte through the battery during periods where a heavy load is being drawn and to pump at a rate which is adequate to prevent substantial accumulation of sediment. In cases such as those presently under consideration, where the heavy load is connected only intermittently, if a pump of capacity adequate to remove sediment during heavy load periods were connected continuously, it would probably draw so much current from the battery as to largely undo the gain in effectiveness brought about by pumping during heavy load periods. Therefore, in accordance with the present invention, means are provided for actuating the pump concurrently with the energization of the heavy load, L2. Such concurrent actuation could be accomplished in many ways, for example, by providing a mechanism responsive directly to the signal directing the connection of the heavy load or by means responsive to the current drawn from the battery, but at present it is preferable that conductors 41 and 42 be connected directly in parallel with a heavy load L2 so as to be energized whenever the load L2 is energized.

The pump 18 may be any of several kinds. If the operation is to be in shallow water, it would be possible to use a rotary pump with appropriate seals. However, rotary pumps have certain limitations and in as much as it is contemplated that the present invention will have its widest application when deployed in deep water, it is at present preferred to use a solenoid operated pump. The details of such a pump are not a part of the present invention but for the sake of completeness such a pump is illustrated schematically in FIG. 2.

Figure 2:
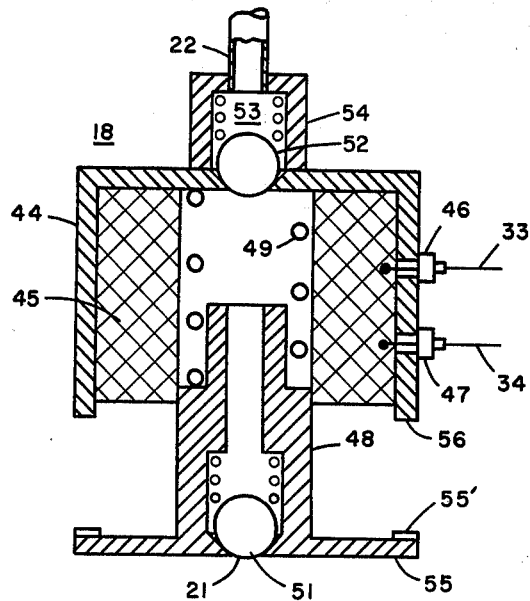
FIG. 2 is a schematic cross sectional diagram of one form of pump which may be used with the invention.

Referring now to FIG. 2, the pump 18 comprises a magnetic frame or housing 44 which surrounds a coil 45 which in turn is provided with electric terminals 46 and 47 which are connected to the conductors 33 and 34 respectively. Within the solenoid 45 is a hollow plunger 48 made of magnetic material which constitutes the active element of the pump. The plunger 48 is shown in its downward, or retracted position to which it is urged by an internal spring 49 which bears against the upper portion of the frame 44 and is preferably fastened thereto. The lower end of the spring bears against a portion of the plunger 48 and is preferably fastened to this plunger at that point. The lower end of the plunger 48 is provided with an internal ball check valve 51 which allows water to enter the plunger in an upward direction, as illustrated in FIG. 2, while preventing water from leaving the interior of the plunger downwardly. At the upper portion of the housing 44, directly above the plunger 48, there is provided another ball check valve 52 which allows water to escape upwardly from the interior of the housing into a chamber 53 formed by a cap 54 fastened to the top of the housing 44. The cap 54 is formed to define, or is connected to, the outlet 22 of the pump. It will be understood that the showing in FIG. 2 of a solenoid pump is purely schematic for illustrative purposes and that the details of this pump form no part of the present invention.

In operation, energization of the solenoid 45 causes the plunger 48 to be drawn upward within the solenoid 45 until a laterally extending portion 55 of the plunger 48 engages the downwardly extending portion 56 of the housing 44. Preferably a thin non-magnetic washer 55' is fixed to the plunger disk 55 so that the two surfaces 55 and 56 do not magnetically stick together after deenergization of the solenoid 45. Sea water trapped within the cylindrical space within the solenoid 44 and within the plunger 48 is thus forced through the outlet 22. To continue the operation, the solenoid must be deenergized so that the plunger 48 will be retracted to the position shown in the drawing during which time additional sea water will enter through the check valve 51 to recharge the pump. Alternate energization and deenergization of the solenoid 45 is provided by means of a timing circuit 68 shown in FIG. 1. This timing circuit 68 is a conventional electronic circuit for generating a substantially rectangular output voltage wave, typically as shown in FIG. 3.

Figure 3:
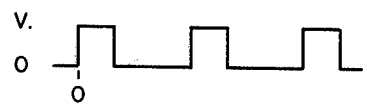
FIG. 3 is a graph useful in explaining the invention.

Referring now to FIG. 3 there is shown the rectangular output voltage wave generated by the timing circuit 68 whenever it is energized. As previously explained, energization occurs whenever the load L2 of FIG. 1 is energized. Typically the circuit may generate an output voltage for one second followed by an off period of two seconds whereupon it repeats the cycle of on for one second off for two seconds. Circuits for generating such waveforms are well known, one example being a simple transistor circuit variously called a pulse generator or oscillator or an astable or free-running multivibrator. Such circuits are well known and need not be further discussed.

The timing curcuit 68 is, of course, necessary only in case of a pump such as illustrated in FIG. 2 which requires alternate energization and deenergization. If a rotary pump should be used, then the timing circuit would not be required and the conductors 41 and 42 could be connected directly to the conductors 33 and 34.

Figure 4:
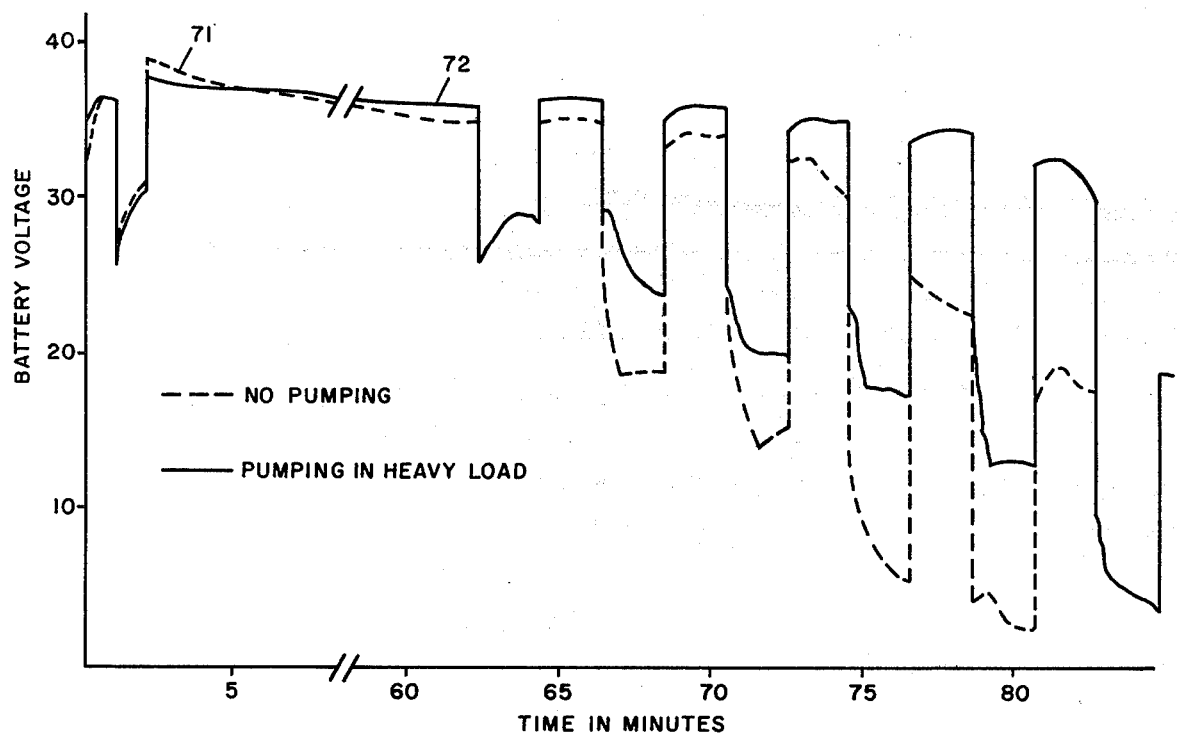
FIG. 4 is a graph illustrating some experimental results.

Referring now to FIG. 4, there are shown the results of tests comparing two substantially identical sea water batteries, one of which was not pumped at all and the other of which was pumped in accodance with the principles of the present invention. The graph shows the output voltage of each of these batteries as a function of time. In each case, the batteries were charged with electrolyte and shortly thereafter subjected to a heavy load for about one minute. This period was followed by about an hour at a light load after which successive periods of about two minutes of each alternating between heavy and light loads were applied. The dotted line 71 shows the output voltage of that battery which was not pumped at all while the solid line shows the output voltage of the battery which was pumped during periods of heavy load. It is obvious from FIG. 4 that the latter battery maintained its output voltage much better than the former. Additionally, it was found that the total amount of energy which it was possible to extract from the battery was much greater in the case of the battery which was pumped than in the case of the battery which was not pumped.

Figure 5:
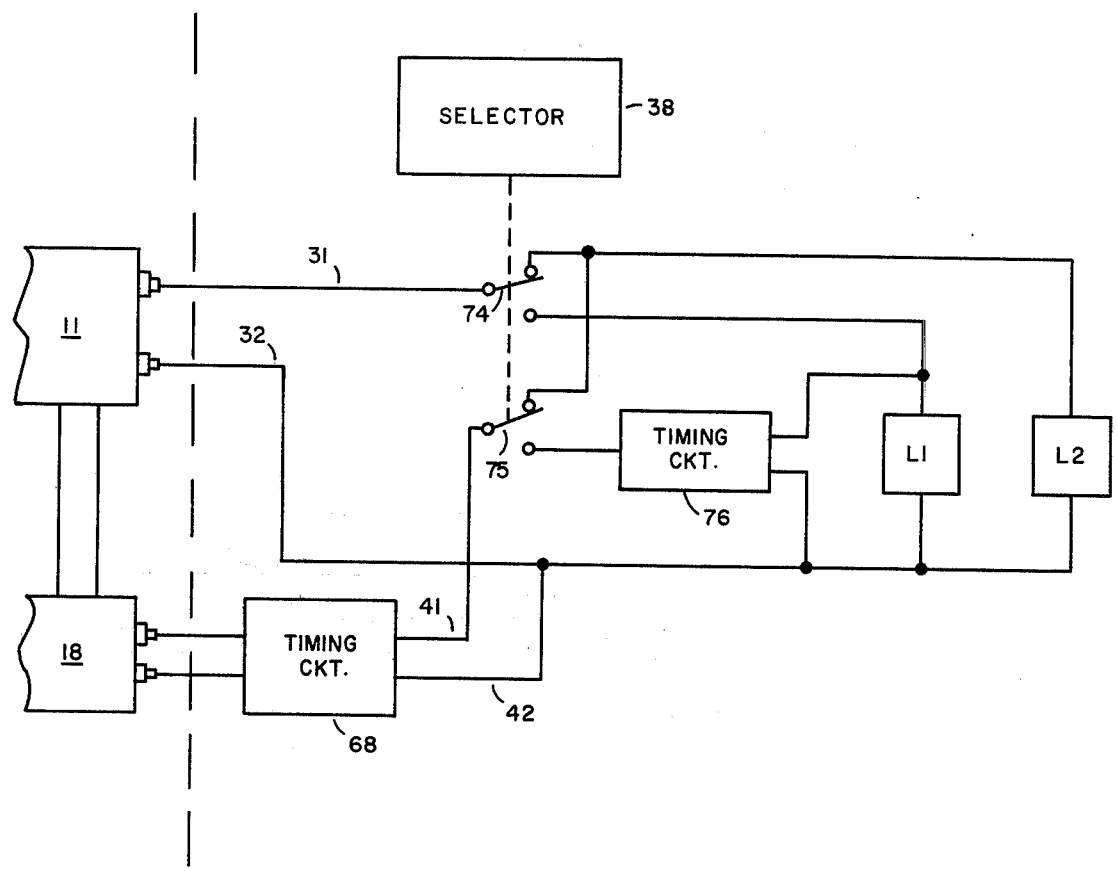
FIG. 5 is a schematic block diagram illustrating a further feature of the invention.

Referring now to FIG. 5 there is shown a modification or extension of the invention. Some sonobuoys may be deployed and remain inactive for a substantial period of time in a standby, or light load condition. During such standby condition, even at light load conditions, sediment will build up to some extent and, for best operation of the battery, this sediment should be cleared away. Under these conditions it is preferred that two switches 74 and 75 be provided which are operated simultaneously by the selector 38 so that either the load L1 or the load L2 is energized at all times. As before, the load L2 represents the load in connection with the generation and transmission of acoustic energy while L1 represents the load required for standby condition and/or acoustic reception and/or data transmission and/or command reception. When the switches 74 and 75 are up, as shown in FIG. 5, the heavy load L2 is energized and the timing circuit 68 and the pump 18 operate as before. When the switches 74 and 75 are in their down position, the light load L1 is energized. Additionally, an auxiliary timing circuit 76 is also energized by being connected in parallel with the light load L1. The output of this auxiliary timing circuit 76 is connected to the conductor 41 so that the timing circuit 68 and the pump 18 are energized under the control of the auxiliary timing circuit 76.

Figure 6:
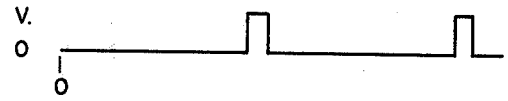
FIG. 6 is another graph useful in explaining the invention.

Referring now to FIG. 6, there is shown the output of the timing circuit 76 as a function of time. When this circuit is first energized, when the switches 74 and 75 are in their lower position, it delivers no output for a substantial period of time which may, for example, be ten minutes. It then delivers an output for a shorter period of time which typically may be about one minute. During this one minute period, the timing circuit 68 will be energized so as to actuate the pump 18 as previously explained through several cycles so as to clear out what sediment has accumulated during the period of light load. After the one minute output of the timing circuit 76, the timing circuit 68 and pump 18 remain quiescent until either the heavy load L2 is energized or until another ten minute period of energization of the light load L1 has passed whereupon the cycle is repeated.

SUMMARY

It has been found that a system in accordance with the present invention improves the output voltage of a sea water battery and in addition allows a larger amount of power to be extracted therefrom. The intermittent operation of the pump allows the inclusion of a pump of adequate capacity without drawing power unnecessarily during periods of light load. Additionally, the battery can be designed for the best compromise between periods of light load and periods of heavy load.

Although specific embodiments of the invention have been described in considerable detail for illustrative purposes, may modifications will occur to those skilled in the art. It is therefore desired that the protection afforded by Letters Patent be limited only by the true scope of the appended claims.

What is claimed is:

1. A power supply system, comprising, a sea water battery including a housing formed to define an electrolyte inlet and an electrolyte outlet and a pump hydraulically connected for pumping sea water into said inlet, characterized in that said system includes a light electrical load and a heavy electrical load, means for selectively energizing said loads from said battery, and means for actuating said pump concurrently with the energization of said heavy load, whereby, upon such actuation, sea water enters said battery through said inlet and is expelled through said outlet.

2. A system in accordance with claim 1 in which said battery housing is formed to define an auxiliary electrolyte inlet and which includes a check valve cooperating therewith to permit circulation of electrolyte by convection when said pump is not actuated.

3. A system in accordance with claim 2 in which said check valve is a hinged flapper valve within said housing permitting entrance but preventing exit of electrolyte through said auxiliary inlet.

4. A system in accordance with claim 1 in which said means for energizing and said means for actuating includes means for establishing electrical connections from said battery to said heavy load and to said pump simultaneously.

5. A system in accordance with claim 4 in which said last named means includes means for connecting said pump in parallel with said heavy load.

6. A system in accordance with claim 1 in which said battery includes first and second electrical terminals, and in which said means for selectively energizing includes an electrical connection from said second terminal to both of said loads and also includes first and second switches electrically connected between said first terminal and said light and heavy loads respectively and also includes a selector for actuating said switches.

7. A system in accordance with claim 1 in which said pump is an electrically operated reciprocating pump.

8. A system in accordance with claim 7 in which said pump includes a plunger for reciprocation through alternating pumping and retracting strokes and also includes a solenoid for actuating said plunger through said pumping stroke when energized.

9. A system in accordance with claim 8 including a timing circuit electrically connected between said solenoid and said heavy load for alternately energizing and deenergizing said solenoid whereby said plunger reciprocates through said pumping and retraction strokes.

10. A system in accordance with claim 9 in which said pump includes a spring positioned to urge said plunger in the direction of said retracting stroke.

11. A system in accordance with claim 1 in which said means for selectively energizing includes means for energizing either one or the other of said loads at all times.

12. A system in accordance with claim 11 including means responsive to the continuous energization of said light load for a first predetermined period of time for actuating said pump for a second predetermined period of time.

13. A system in accordance with claim 12 in which said first predetermined period of time is much longer than said second predetermined period of time.

14. A system in accordance with claim 13 in which said means responsive to the continuous energization of said light load includes a timing circuit energized concurrently with the energization of said light load for actuating said pump for said second predetermined period of time beginning after the elapse of said first predetermined period of time.

* * * * *